Patented Dec. 7, 1926.

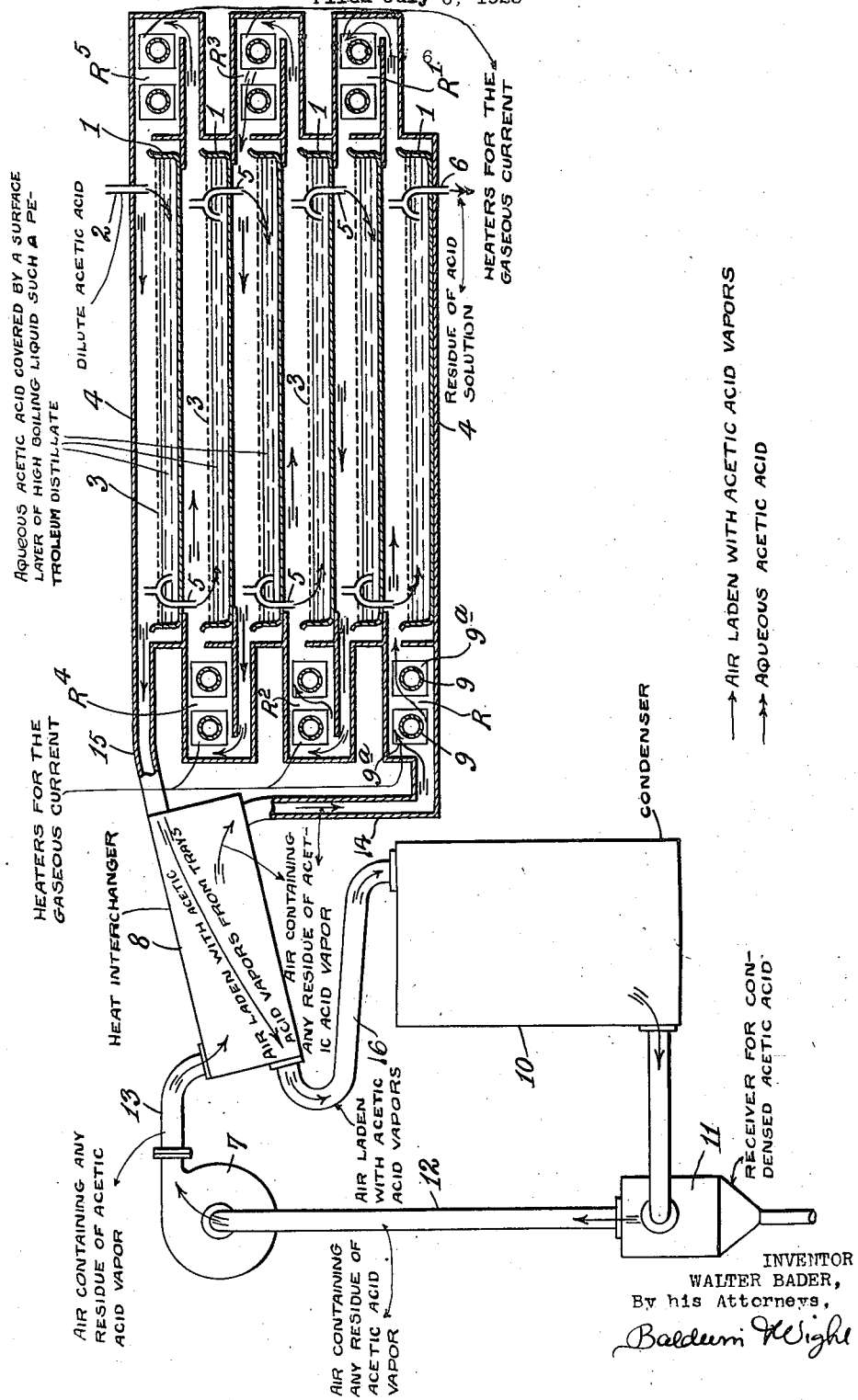

1,609,393

UNITED STATES PATENT OFFICE.

WALTER BADER, OF SPONDON, NEAR DERBY, ENGLAND, ASSIGNOR TO AMERICAN CELLULOSE AND CHEMICAL MANUFACTURING COMPANY LIMITED, A CORPORATION OF DELAWARE.

PROCESS FOR THE SEPARATION OF ONE OR MORE CONSTITUENTS OF LIQUID MIXTURES.

Application filed July 6, 1923, Serial No. 649,962, and in Great Britain September 6, 1922.

The usual way of separating the constituents of liquid mixtures is by fractional distillation, making use of the different boiling points of the constituents, or by extraction, making use of their different solubility in a solvent. In many cases, the application of either method is technically or economically impossible. Thus for distillation, this is the case if the constituents form a homogeneous constant boiling mixture or if their boiling points are very close together. Dilute acetic acid, for instance, cannot be economically separated into water and glacial acetic acid because the boiling point of a 20% acid is only about 0.5° C. higher than that of water, and therefore a fractionating column of reasonable dimensions and an economical expense of heat will not prevent a large amount of acid distilling away with the water.

The present invention deals with cases of this kind. It is based upon the following principle.

If the surface of a liquid mixture contained in a closed vessel be covered by a thin layer of an insoluble liquid of lower density but preferably much higher boiling point (hereafter called the oil film), and if the whole arrangement be kept at some temperature below the boiling point of the mixture, the vapour phase above the liquid will, after a certain time, have practically the same composition it would have if the oil film were not present, whatever the differences in the solubilities of the constituents in the oil film may be. The vapour of the oil film comes in simply as an addition. Since absolute insolubility of two liquids in one another does not exist, the different constituents of the mixture must, however little, dissolve in the oil film and exercise at the surface of it their vapour tension, only slightly modified by the small solvent power of the oil.

If the vapour above the liquid be now continuously removed, for instance by blowing an air current over the surface, the composition of the vapour must change if the constituents of the mixture are differently soluble in the oil film. Each single constituent tends to replace its vapour carried away, by evaporating at the surface of the oil film. The speed with which the different constituents can supply fresh vapours into the air space depends mostly upon their relative solubility in the oil. The most soluble evaporates most quickly.

The composition of the vapours swept away by a rapid air-current from the surface of the oil film is principally determined by the solubilities, not by the boiling points. The paradoxical result may be realized that the higher boiling constituent distils off while the lower boiling one remains behind. The mutual solubility of solvent and solute should be very small; a fraction of 1% gives a sufficient technical effect.

The new process may be carried out in any kind of apparatus in which the liquid mixture can be spread out so as to present a large horizontal surface. This surface is covered with a layer, preferably as thin as possible, of a liquid which, to be suitable, should have the following properties:—

(a) Very low solubility in the mixture and, if possible, also in the distillate.
(b) Preferential solvent power for the constituent of the mixture which it is intended to isolate.
(c) Relatively high boiling point.
(d) Lower density than the mixture.
(e) Capability to spread out easily upon the mixture to a thin, unbroken film.

This liquid may, of course, be itself a mixture.

The mixture is heated without raising to boiling but preferably as high as it is possible without bringing it to boil, and air or any other suitable gas or gas mixture, or an indifferent vapour, is blown or drawn over the surface of the liquid. After leaving the apparatus the gas or indifferent vapour is led into a cooling or absorbing system where the vapours taken up by it are condensed or otherwise recovered. If required the gas may then go back to the blower or be returned to the apparatus, whereby a closed system may be established without any loss of uncondensed vapours.

The evaporating system may be worked at any convenient pressure. The air or gas may be compressed or even liquified for the recovery of the vapour. The heating of the liquid may be done in any convenient way, in particular by means of the working gas itself, which can be heated before admission to the liquid.

The following example with reference to the accompanying part sectional diagram of apparatus describes one form of application of our invention to an important technical case, but we do not limit our claims to its particular features, or to the type of apparatus described.

The drawing is a diagrammatic elevation of the apparatus, partly in longitudinal section, the section being taken through the evaporating trays, their associated air current heaters and the enclosing chamber containing the trays and air heaters.

Example.

Dilute acetic acid, for instance of 30% strength, is contained in wide, flat trays 1 of acid resisting material, the acid being admitted, preferably hot, to the uppermost tray by the inlet pipe 2, and overflowing from tray to tray. The surface of the acid in the trays is covered with a thin layer of a high boiling petroleum distillate, indicated by the broken line 3, e.g. a spindle oil which will dissolve about 0.3% of its weight of acetic acid, but will only dissolve the merest trace of water. A number of the trays 1 are arranged one above the other in a closed heat insulated chamber 4, so that a narrow free space remains between the liquid in one tray and the bottom of the next tray. Each tray has an overflow 5, taking the liquid from its bottom into the tray below, by means of which arrangement all the trays are fed from above, the residual acid leaving the bottom of the chamber at 6.

Air is supplied by a blower 7 preferably via a heat interchanger 8, to the lowest tray after having passed a heating system, e.g. a radiator-heater R which brings its temperature to about 100° C., the air passing over the outside of the heating pipes 9 of the radiator which are provided with ribs or gills 9ª in the usual way. The air passes over the surface of the liquid in the lowest tray 1, then over a second heater, marked $R^1$, similar to the first, to regain the required temperature of about 100° C., flows over the second tray, and so on over the successive trays and similar heaters marked $R^2$, $R^3$, $R^4$, $R^5$, interposed respectively between each two trays. After thus passing over all the trays in series, with heating up between each two trays, the air current is led, preferably via the heat interchanger 8, to a condenser 10, in which for example it may pass through a copper coil cooled by a freezing mixture. Practically all the acetic acid vapour is condensed in the condenser and can be collected in a receiver 11. The air from the receiver is conducted back to the blower 7 by the pipe 12 so that any vapours it may still contain are returned to the chamber containing the trays. Preferably the outgoing air from the series of trays is used to preheat the ingoing air in a heat interchanger as illustrated for example in the figure in which the air from the blower 7 is delivered by the pipe 13 through the heat exchanger 8, to the pipe 14 leading to the heater R of the bottom tray, and the vapour-laden air current from the top tray passes by the outlet pipe 15 to the heat interchanger and from the latter to the condenser by the connection 16. The heat interchanger may of course be of the usual construction in which the current in one direction passes through tubes and that in the opposite direction over the outside of the tubes.

With a working such as described it has been found, for example, that 1000 sq. ft. of liquid surface can yield about 1 ton of distillate in 24 hours. This distillate contains about 60% acetic acid, a small amount of oil floating on it. If a higher concentration is desired, the distillate may again be treated in the same way, which brings it to over 80% strength. A third treatment can yield an acid of 92% to 95% strength. Oil which distils away may be replaced from time to time in the trays as required.

What I claim and desire to secure by Letters Patent is:—

1. A process for the separation of one or more constituents out of a liquid mixture, characterized by evaporation from the surface without boiling, the surface of the mixture being covered by a thin layer of a solvent practically insoluble in the mixture, the solvent having a selective solvent power for the constituent or constituents to be isolated, and the vapour being carried away from the liquid surface by a gas or vapour current from which they are subsequently recovered.

2. In a process according to claim 1, returning the gas or vapor from which the constituents have been recovered so that a closed circuit is formed.

3. In a process according to claim 1, heating the gas or vapour before admission to the liquid surface, thus using the gas or vapour as a heating medium for the liquid.

4. The process of claim 1 in which the liquid mixture is aqueous acetic acid.

5. In a process according to claim 4, the use of petroleum distillates as solvents.

6. A process for the concentration of acetic acid from dilute aqueous solutions thereof, comprising covering the surface of the dilute acetic acid solution with a film of a high boiling solvent having a selective solvent power for acetic acid, circulating over the film-covered acetic acid solution a rapid current of heated air maintained at a temperature adapted to heat the acetic acid solution to a point somewhat below boiling, and recovering from the air current the acetic acid vapors taken up thereby.

In testimony whereof I have hereunto subscribed my name.

WALTER BADER.